US006836476B1

(12) United States Patent
Dunn et al.

(10) Patent No.: US 6,836,476 B1
(45) Date of Patent: Dec. 28, 2004

(54) BUSINESS MODEL, SYSTEM AND METHOD FOR VOICE AND/OR DATA COMMUNICATIONS WITH LOCAL BUSINESS

(75) Inventors: James M. Dunn, Ocean Ridge, FL (US); Edith H. Stern, Boca Raton, FL (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/465,538

(22) Filed: Dec. 16, 1999

(51) Int. Cl.[7] .......................... H04L 12/28; H04L 12/66
(52) U.S. Cl. ....................... 370/352; 370/355; 370/401; 455/457; 379/142.1; 701/214
(58) Field of Search ................................ 370/352, 400, 370/357, 465, 353–356, 401; 455/457; 709/217, 227, 237; 37/88.17, 142.1; 701/209, 214

(56) References Cited

U.S. PATENT DOCUMENTS

| | | | | |
|---|---|---|---|---|
| 5,905,736 A | * | 5/1999 | Ronen et al. ............... 370/546 |
| 6,145,002 A | * | 11/2000 | Srinivasan .................. 709/225 |
| 6,185,194 B1 | * | 2/2001 | Musk et al. ................ 370/260 |
| 6,202,023 B1 | * | 3/2001 | Hancock et al. ............ 701/201 |
| 6,359,892 B1 | * | 3/2002 | Szlam ........................ 370/401 |
| 6,401,034 B1 | * | 6/2002 | Kaplan et al. .............. 701/209 |

* cited by examiner

*Primary Examiner*—Duc Ho
(74) *Attorney, Agent, or Firm*—Richard A. Tomlin; Jon A. Gibbons; Fleit, Kain, Gibbons, Gutman, Bongini & Bianco P.L.

(57) ABSTRACT

An apparatus, computer readable medium and method for communicating over a telecommunications network, such as the Internet, with a provider of a service, such as a business. A method for communicating over a telecommunications network with a local representative of an entity, comprising the steps of: receiving, over a data telecommunications network, a request for a connection with a local representative of an entity from a subscriber, wherein the data telecommunications network supports simultaneous voice and data connection over a single line from the subscriber to an Internet Service Provider (ISP) site; determining the geographical location of the subscriber; translating the request from the directory listing database a local representative of the entity that is the geographically nearest to the subscriber requesting a connection; and establishing a voice connection between the subscriber requesting the connection with the local representative of the entity.

45 Claims, 7 Drawing Sheets

| Brookstone | Eckerds Drugs | Bally's Gym | Dominos | Pizza Hut |

Home Savings

Home Depot

MicroAge

WELCOME TO YOUR ISP HOME PAGE. The Internet is yours. Surf the net, or stay at home. Click to call any of your local businesses.

Wollerman's

REI

K mart

CD WAREHOUSE

L.L. Bean

Walmart macy's
macy's.com
Federated
DEPARTMENT STORES, INC.

IBM

Sears

The Best Chinese Restaurant around

BUSINESS MODEL, SYSTEM AND METHOD FOR VOICE AND/OR DATA COMMUNICATIONS WITH LOCAL BUSINESS

CROSS-REFERENCE TO RELATED APPLICATIONS

Not Applicable.

BACKGROUND OF THE INVENTION

1. Field of the Invention

The invention relates to the field of telecommunications and networks, and more particularly has special applications to the Internet and the use of directory listings for a local business.

2. Description of the Related Art

Communication has evolved tremendously over just a short period of time. In the past, communication between people, however close in proximity, was quite difficult and inefficient. The entire process of message delivery, from dispatch to receipt, was extremely time consuming. Today, however, through the use of current technology, one cannot only communicate easily with another through the telephone, but also retrieve information in the comfort of their own home by using a telephone directory, an electronic source such as the GTE Superpages, or traditional voice directory assistance (411). Technology has provided a more efficient way for people to conduct their affairs, whether for business purposes or for personal reasons.

Another way in which technology has advanced is with the creation of the Internet. The Internet, and World Wide Web (WWW), have become popular tools through which information from any participating computer can be accessed worldwide and within a matter of seconds. The Internet provides many distinct advantages, including the ease of being able to access web pages of information and the ability for companies to reach mass populations with their advertisements.

There are many useful facets of the Internet, one of which is known as hypertext. This allows a user to access additional information from a web source by simply pointing, say with a mouse, at the hypertext and clicking. Another critical feature of the Web is its ability to process information in remote locations without requiring a specialized application program for each possible type of content that may be accessed. Thus, the same content may be viewed across different platforms.

Despite many efficiencies of the Web, there are several shortcomings. The web is world-wide and gives no indication of location. One shortcoming is the difficulty in finding out the location of the provider of a service. This shortcoming is now illustrated with an example. For example, when an end-user seeks a help desk response, distance doesn't matter. On the other hand, distance is an important factor mainly for consumers. When a consumer wishes to order a takeout meal, that consumer is likely to order it from a local restaurant. As mentioned earlier, she has a variety of ways in which to obtain the phone number of the desired establishment. If the user is in an unfamiliar area, she may not know which restaurant in a restaurant chain is nearby and which is more distant; for this reason she may have to seek assistance. Because chains and franchises have large number of locations, the consumer will have to choose from a myriad of telephone numbers without being sure of which will connect her to the location nearest her. Looking up information through using telephone book or directory assistance can be time consuming and without knowledge of an area, the written address may be of no help. Moreover, the vast proliferation of area codes in recent years, has made keeping track of regional localities even more difficult. Accordingly, a need exists for providing users with a more convenient way of acquiring local information.

Although the Internet has user-friendly browsers, requesting information on the Internet can prove to be tedious and frustrating at times, especially for non-proficient users. A need exists therefore, to provide users with an easier method of getting the information themselves.

It is common for regional, national and multi-national businesses to have a central web page. This way consumers can find information common to all parts of the business. Such sites generally allow consumers to contact them via e-mail, and the e-mail is handled also from a centralized perspective. Such sites increasingly have a "click-to-call" option, where the user can instigate a voice conversation with a corporate call center. The call centers may be either centralized, or they are virtual call centers, geographically spread to take advantage of regional differences in the cost of doing business. Sometimes however, consumers want local information rather than national. For example, if users want to determine local supplies of parts, or waiting times for service, they must contact the local branch of the enterprise. E-mail could be directed to the site address requesting this date, but this asynchronous communication does not satisfy the need for real-time queries.

SUMMARY OF THE INVENTION

Briefly, in accordance with the present invention, A method for communicating over a telecommunications network, such as the Internet, with a provider of a service, such as a business. A method for communicating over a telecommunications network with a local representative of an entity, comprising the steps of: receiving, over a data telecommunications network, a request for a connection with a local representative of an entity from a subscriber; determining the geographical location of the subscriber; translating the request from the subscriber with the geographical location of the subscriber into a query of a directory listing database; retrieving from the directory listing database a local representative of the entity that is the geographically nearest to the subscriber requesting a connection; and establishing a voice connection between the subscriber requesting the connection with the local representative of the entity.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Exemplary Systems
1. End User Connection to a Distant Host through the Internet with a Separate Connection to a Local Business Site without ISP Cooperation To begin, it is important to distinguish between a telecommunications service provider and a data telecommunications service provider. The term data telecommunications service provider is used herein to refer to an Internet Service Provider (ISP) or the Internet or equivalent data packet network. On the other hand, the term telecommunications service provider is a broader term to include not only transmission by data networks, but transmission by PSTN (public switched telephone networks), as well. The PSTN is defined here as all equipment world wide (e.g., land based, radio, satellite, or other) enabling ordinary telephone users to connect to other telephone users, but excludes private telephone networks such as "tie line" systems maintained or leased by private enterprises.

Figure 1:
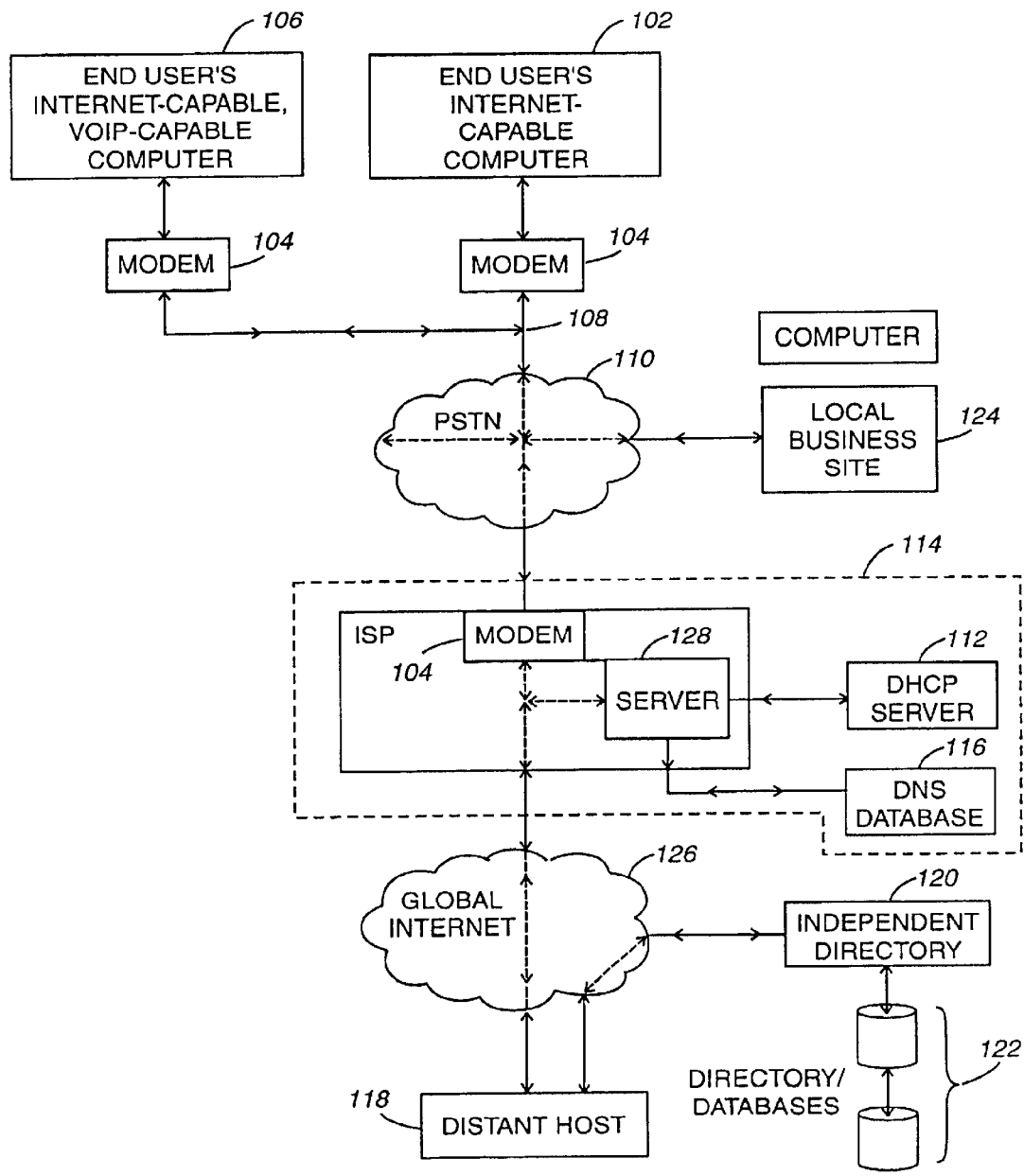
FIG. 1 is a block diagram of a PSTN coupled with an ISP for Internet Service through which an end user gains a connection to a local business site via the Internet without ISP participation, according to the present invention.

FIG. 1 is a block diagram of a PSTN coupled with an ISP for Internet Service, according to the present invention. An end user, with his Internet-capable computer 102 such as an IBM compatible PC with a modem port, dials the phone number of one of the ISP's points of presence (POPs) over a wire line, where he is connected to a specific modem within the ISP (104 in the ISP block). Having achieved digital modem-to-modem connection, through the modems 104 linked through the PSTN 110, the computer 102 sends a connection request through the PSTN 110 to the ISP 114. In another embodiment, the end user could connect via a laptop computer with a wireless modem while on his way to his destination on a plane or bus.

Using protocols common at the time of this writing, during the process of the user connecting to the ISP (Internet Service Provider) 114, his computer 102 is assigned a temporary IP address (Internet Protocol Address) by a DHCP (Dynamic Host Control Protocol) Server 112. This IP address is needed for communication and the transfer of data between the end user's computer 102 and any host with which she may be connected. After being assigned her temporary IP address, the end user is now able to access the services of the ISP, such as the ISP's web server.

Should the end user then desire to connect to another website such as www.ibm.com she enters that URL (Universal Resource Locator) into her browser. The web address or URL corresponds to an IP address which, in turn, corresponds to the desired distant host 118. To determine the IP address, the browser causes a query to a DNS Server 116 that keeps a listing of URLs and their corresponding IP addresses. With the URL resolved to an IP address, the web site 118 can be contacted through the global Internet 126.

If an end user would like to gain a VOIP (Voice Over Internet Protocol) connection to a local business site 124 such as Eckerd Drug, the process is similar but includes a few added steps. The local business site 126 may or may not have a computer 126.

Using her Internet-capable, VOIP-capable computer 106, the end user would connect to her ISP 114 and to the entity's distant server 118 in the same way as described above. The end user then indicates to the distant host (by clicking a link or typing a message) that she wishes to gain a VOIP connection to a local Eckerd Drug site 124. Through a method according to the present invention, the distant host 118 determines the nearest local business site 124 to that end user. Then, the distant host 118 contacts a directory provider 120 to retrieve the telephone number of the local business site 124. The directory provider 120 queries its directory databases 122 for the requested telephone number and returns it to the distant host 118. If the local business 124 has VOIP capability, the distant host 118 simply sets up a VOIP connection between the end user's computer 106, and the local business site's computer. If the local business site does not have a VOIP capable computer, the distant host 118 establishes a VOIP session between a gateway (not shown in FIG. 1) operated by a gateway service provider, and the user's computer 106. The distant host 118 directs the gateway to establish a PSTN connection to the local business 124, and to bridge these two links together, creating a path for voice conversation.

Figure 2:
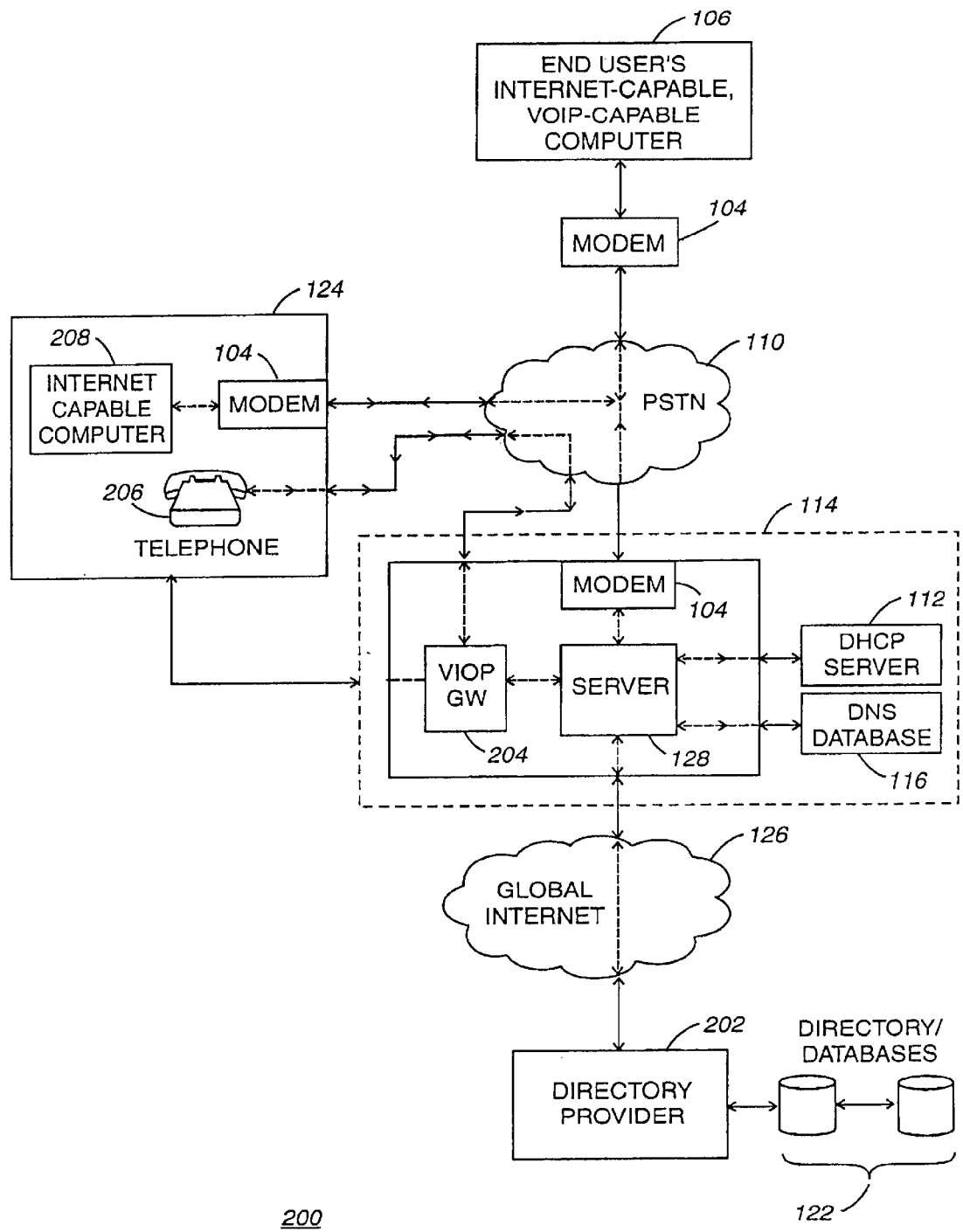
FIG. 2 is a block diagram of an alternate embodiment of FIG. 1 with an ISP service in connecting a local business site with or without VOIP capabilities, according to the present invention.

2.0 End User Connection to a Local Business Site with VOIP Capabilities and to a Local Business Site Without VOIP Capabilities as a Service Provided by the ISP FIG. 2 is a block diagram of an alternate embodiment of FIG. 1 with an ISP service in connecting a local business site with or without VOIP capabilities, according to the present invention. In FIG. 2, the assumption is made that the ISP 114 has the necessary hardware and software to determine the end user's location and that of the nearest local business site 124. This is described in more detail below.

Figure 7:
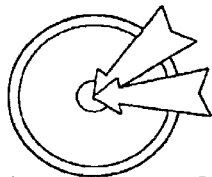
FIG. 7 is an illustration of a graphical interface of an ISP's homepage as it would appear on the end user's Internet capable computer, according to the present invention.
Figure 7:

Again, the end user connects globally with her Internet-capable, VOIP-capable computer 106 and modem 104 or other hardware to her ISP 114, such as America Online, according to the process described in FIG. 1. FIG. 7 is an illustration of a graphical interface of an ISP welcome page as it might appear on the end user's Internet capable computer, according to the present invention. The user now selects the desired business that she wishes to contact such as Eckerd Drug whether by clicking an icon or graphic or other means provided by the ISP 114. The ISP 114 then determines the end user's location and that of the nearest local business site 124 of Eckerds. In another embodiment, a T1 Line or equivalent line connects directly the ISP 114 and the local business site 124.

The ISP 114 contacts a Directory Provider 202, (or other provider of directory information) such as Bell Atlantic, to request the telephone number of that local business site 124 or the ISP 114 may have such directory databases itself. The Directory Provider 202 queries its directory databases 122 for the requested telephone number and returns it to the ISP 114. If the local business 124 has VOIP capability, or any Internet address, the same or another directory query returns VOIP or other Internet address information to ISP 114.

If the local business site 124 has VOIP capabilities, the ISP 114 simply sets up a VOIP connection between the end user's computer 106 and the local business site's computer 208. However, if the local business site's computer 208 does not have VOIP capability, the process becomes more complicated. If data transfer and voice are both desired, the ISP 114 may set up two simultaneous connections between the end user and the local business site 124, wherein one connection is for voice and one connection is for data. If only voice is desired, a single connection is sufficient. Note that site 124 may not even have a computer.

If only a voice connection is desired between the user at 106 and the local business 124, the ISP establishes a VOIP session between a gateway, VOIP GW 204, and the user 106. The ISP also establishes a PSTN phone call between the VOIP GW 204, and the site 124's telephone, 206. These two are conferenced or bridged together, providing a voice connection from the user to the business 124, which is partially VOIP (user 106 to ISP) and partially PSTN (ISP to business 124). In this way, businesses need not operate a computer to participate.

If both voice and data connection between user 106 and the business 124 are desired, then it is assumed that the business 104 has a computer 208 capable of internet access through a modem 104 or other means (such as direct line to the ISP, not currently shown in FIG. 2). If the computer 208 is VOIP capable, then the VOIP session may be intermixed over the network connection with any data transactions.

If the computer 208 is not VOIP capable, then the ISP establishes a hybrid VOIP/PSTN call as described above to allow voice communication with the local business 124. Data packets received at the ISP are not directed to the VOIP GW 204, but are split off and instead directed to the computer 208.

Exemplary Process Flows

Figure 3:
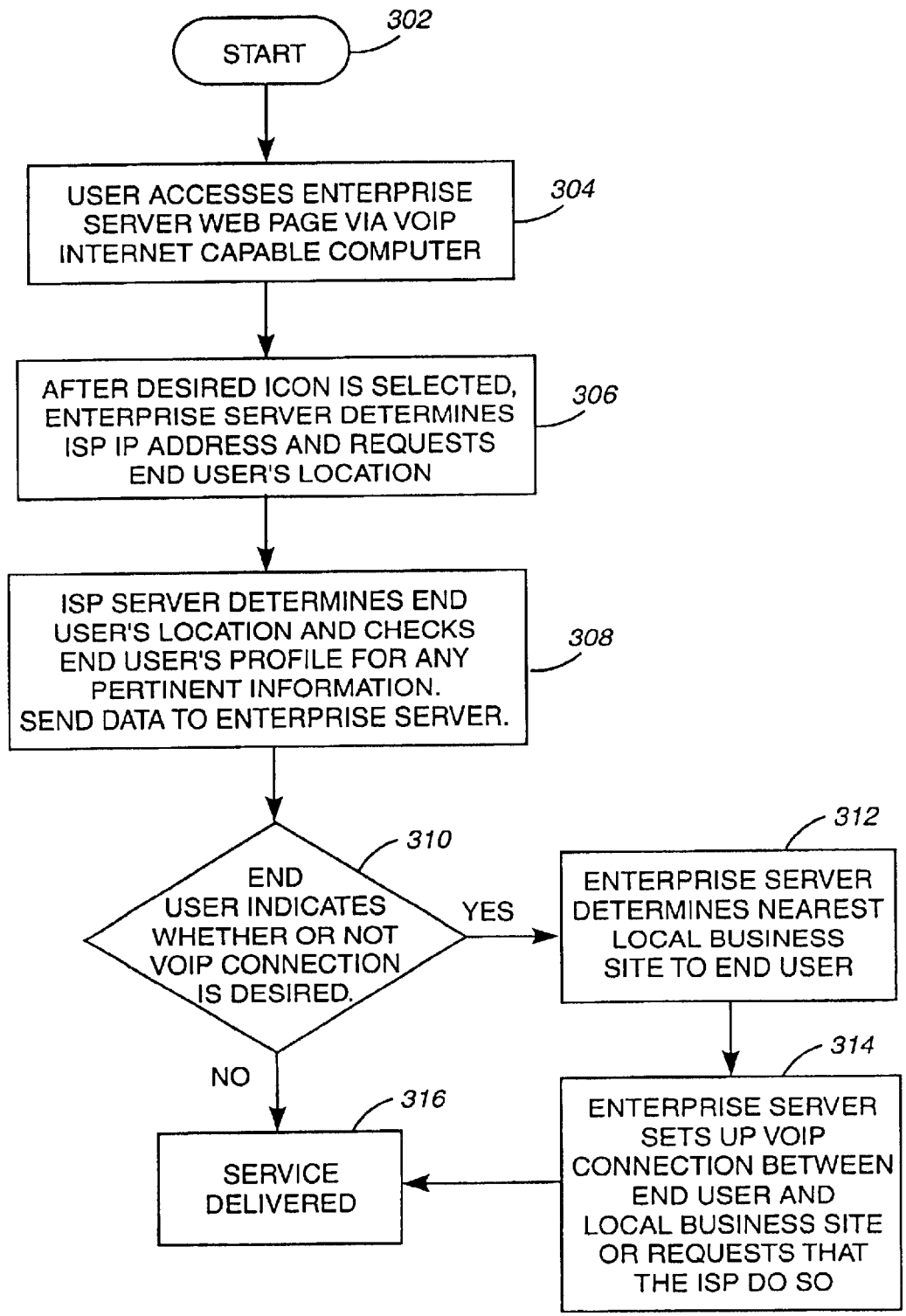
FIG. 3 is a flowchart for connecting an end user with a provider of a local service via a network voice connection, where the ISP cooperates with the enterprise to determine the end user's location according to the present invention.

FIG. 3 is a flow chart for connecting an end user with a local representative of an entity with a network voice connection, as a service of the entity, but with the cooperation of the user's ISP. The user accesses the entity by visiting the entity's web page, available on what is denoted in the figure as the enterprise server.

The end user first accesses the enterprise web page, such as available on server 118, via her internet-capable, VOIP capable computer, steps 302 and 304. After the end user selects the desired icon or graphic or trademark (such as drugs or Eckerd), the enterprise server 118 determines the end user's ISP's IP address and requests the end user's location, step 306. The ISP 114 determines the user's location and checks that user's geographical profile for any other pertinent information. The ISP determines the user's location through one of several methods. If the user has employed a dial up modem to access the ISP, the ISP can determine the calling line ID at the time of connection, during the time where authorization to connect is established. The calling line ID can then be used, in conjunction with existing directory tables/services, to determine the zip code or address from which the user is calling. When the ISP is also the local exchange carrier, this information is readily accessible. If the ISP is not the local exchange carrier, this can be obtained through a query of a directory provider.

When the ISP has been accessed through a permanent connection, such as might be possible from a hotel, or a large enterprise, the ISP may retain the address and can associate the zip code/address with all selections from that set of IP addresses. If the ISP is also a cellular carrier, then the same methods used to provide 911 location can be used to identify the location of the caller. After acquiring this information, the ISP 114 returns it to the enterprise server, step 308. At this point, the enterprise server 118 prompts the end user as to whether or not she wishes a VOIP or voice connection with the desired business step 310. If the user desires a voice connection, the enterprise server 118 then determines the nearest local business site, for example, the nearest Eckerd Drug to the user 312 and then sets up the voice connection between the user and Eckerd 314. If the local business site 124 has VOIP capabilities, the enterprise server 118 simply sets up a VOIP connection between the end users computer 106 and the local business site's computer 208. However, if the local business sites computer 208 does not have VOIP capability, or if the local business site 124 does not have a computer, the process becomes more complicated. The enterprise server 118 engages the services of an internet gateway provider in order to complete the call over the PSTN. Finally, Eckerd Drug can provide the user with whatever service she wishes 316. (Should the user not desire a voice connection, the enterprise server 118 simply transfers data between Eckerd and the user to provide the user with whatever service she wishes 316. For example, the service desired might be filling a prescription to be retrieved at the Eckerd's nearest the user's hotel.

Figure 4:
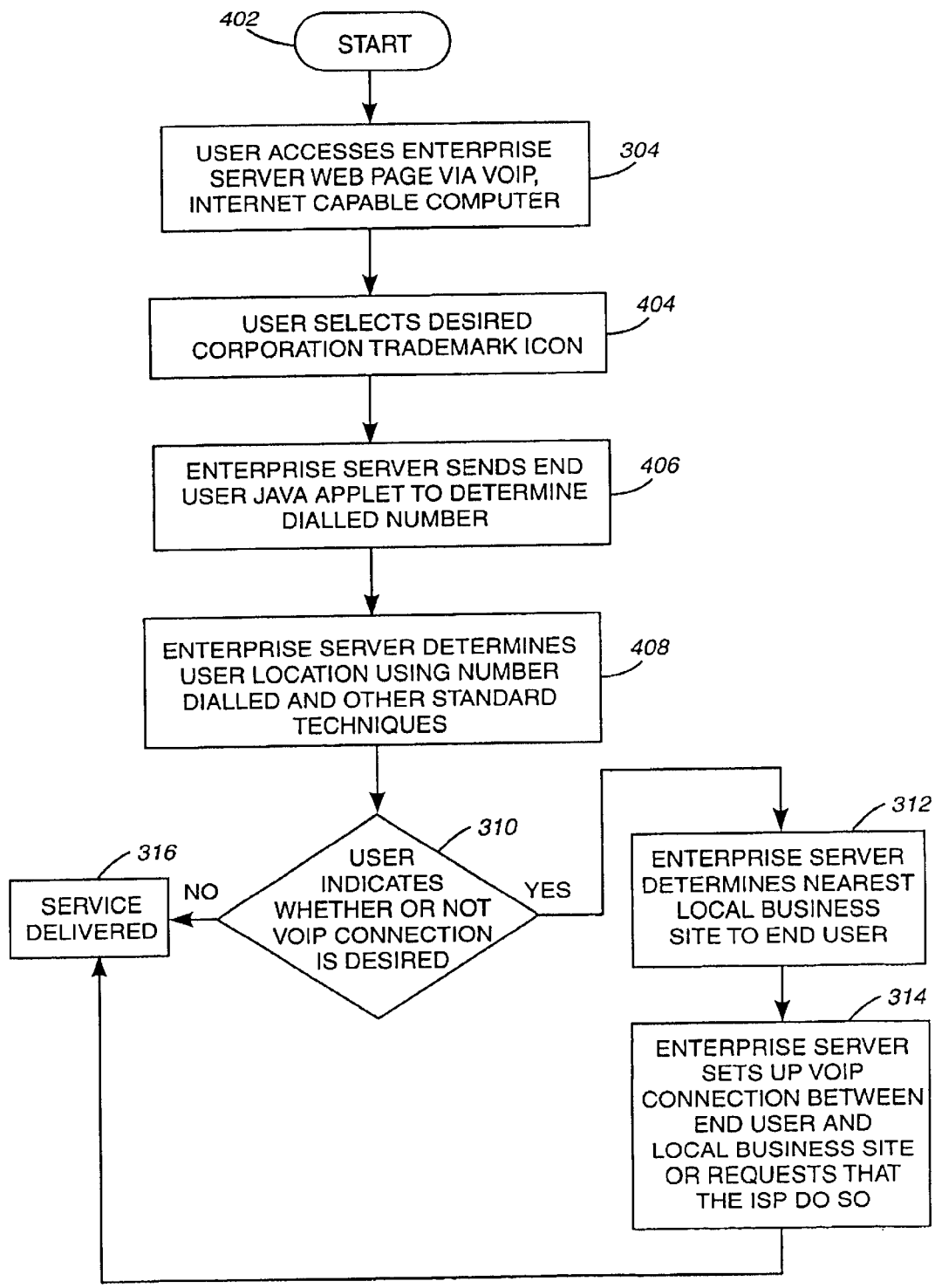
FIG. 4 is a flow chart of FIG. 3, for connecting an end user with a provider of a local service via a network voice connection according to the present invention but, where the server determines the end user's location by itself, according to the present invention.

Turning now to FIG. 4, shown is a flowchart. FIG. 4 is a flowchart of FIG. 3, for connecting an end user with a local representative via a network voice connection according to the present invention but, where the enterprise server determines the end user's location by itself, according to the present invention. As indicated by FIG. 4, if the user wishes a connection between herself and a local business and her ISP does not have the capability to cooperate in determining user and business location, the enterprise server 118 must gain this information on its own. Firstly, the user accesses a webpage on the enterprise server 118 via her Internet-capable, VOIP capable computer 304. The user then selects the desired corporate/trademark icon 404. The enterprise server 118 then sends a JAVA applet to the user's computer to determine the number that computer dialed 406. After gaining this information, the enterprise server 118 determines the user's location using the dialed number and other standard techniques according to the present invention 408. The enterprise server 118 now prompts the user as to whether or not she wishes a VOIP or voice connection to the local business 310. If this voice connection is desired, the enterprise server 118 determines the nearest local business site to that user 312. Then, the enterprise server 118 sets up the voice connection between that user and the local business 314. After performing these operations, or if the user did not wish a voice connection, service can be delivered by the business 316.

Figure 5:
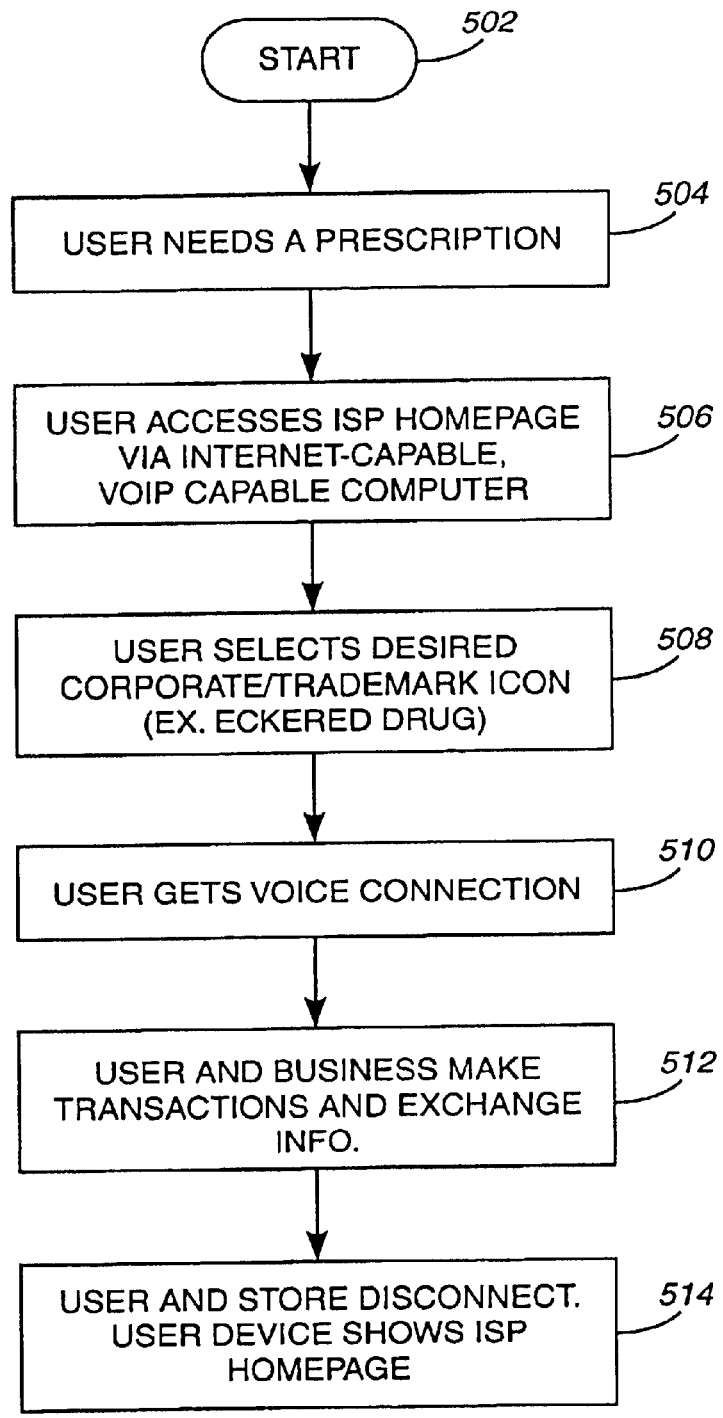
FIG. 5 is a flowchart of the process through which an end user completes a transaction with a local business via an Internet voice connection from the end user's point of view, according to the present invention.

FIG. 5 is a flowchart of the process through which an end user completes a transaction with a local business via an Internet voice connection from the end user's point of view, according to the present invention. Suppose the user needs a prescription; she wishes to connect to the nearest drug store such as Eckerd Drug and order the prescription, steps 502, 504. The user accesses her ISP homepage via her Internet-capable, VOIP-capable computer, step 506. The user, then selects the desired corporate/trademark icon such as Eckerd or Drugs, step 508. The user is then set up with a voice or data connection to the nearest Eckerd, step 510. The user can now order the prescription and get directions, step 512. When finished, the user and store disconnect and the user is returned to her ISP homepage, step 514.

Figure 6:
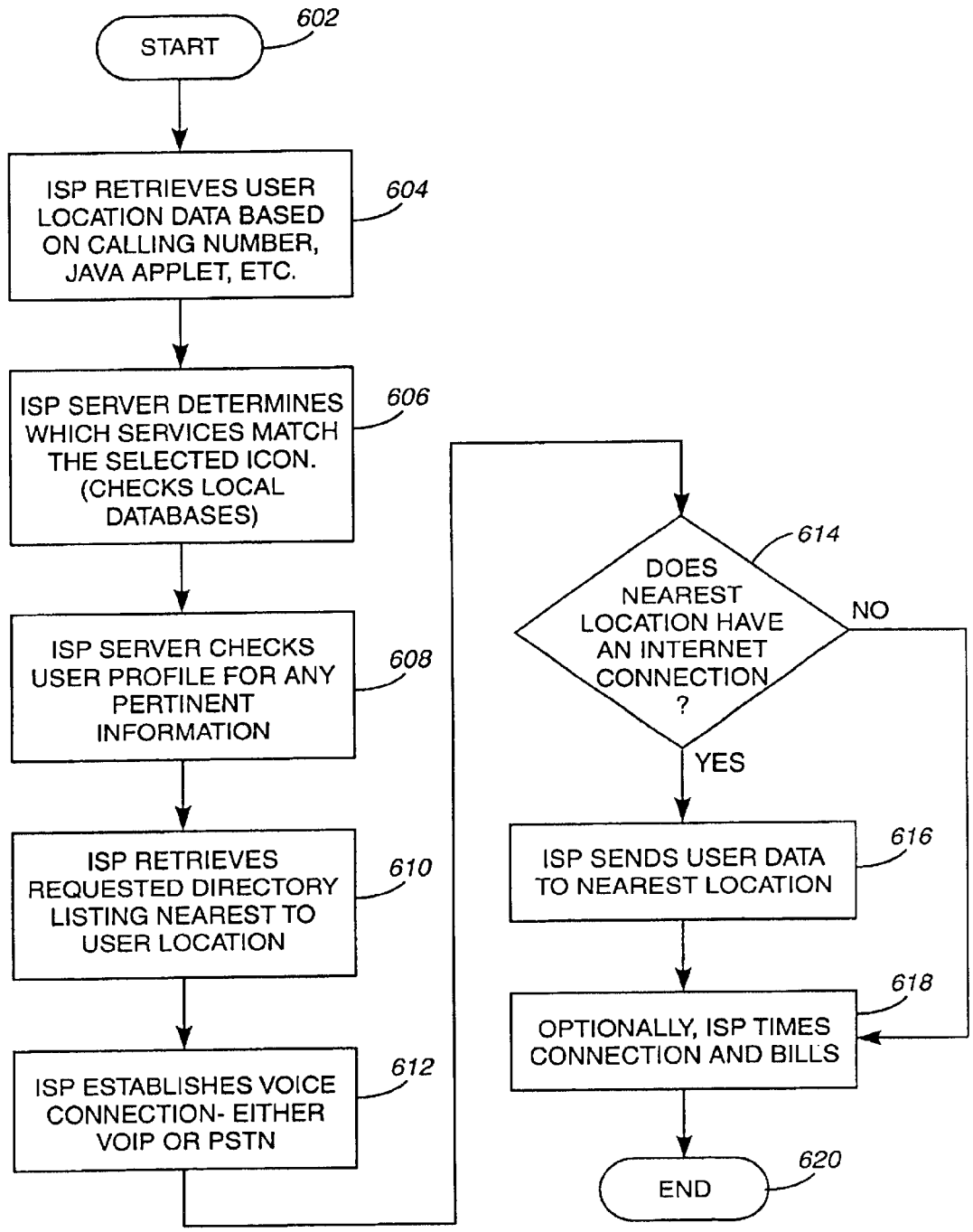
FIG. 6 is a flowchart of the process through which the end user's ISP sets up the desired voice connection between an end user and a local business site, according to the present invention.

FIG. 6 is a flowchart of the process through which the end user's ISP sets up the desired voice connection between an end user and a local business site, according to the present invention. The ISP first retrieves the user's location data based on calling number, JAVA applet, or other means such as querying the Modem Registry as defined in the Microsoft Windows 95 Resource Kit or other equivalent means to find the user's information processing system network connection address, step 604. Then, the ISP 114 must determine which services match the selected corporate/trademark icon, step 606. The ISP 114 checks the user's profile for any other pertinent information, step 608 and then retrieves the requested directory listing nearest to that user's location, step 610. If desired, the ISP establishes a voice connection, either VOIP or Gateway to the PSTN in the manners previously described. Further, the ISP server can check if the business site has an Internet connection, step 614. If so, the ISP server sends the user data to the business, step 616. Optionally, the ISP 114 can time and bill the user and/or business for the connection, step 618. After this, or if the business terminates the Internet connection, and the process ends, step 620.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method at an Internet Service Provider site for communicating over a telecommunications network with a local representative of an entity, comprising the steps of:
    receiving, over a data telecommunications network, a request for a connection with a local representative of an entity from a subscriber, wherein the data telecommunications network supports simultaneous voice and data connection over a single line from the subscriber to an Internet Service Provider (ISP) site;
    determining the geographical location of the subscriber by using a caller-ID of the subscriber making the request and if the caller-ID is not available, using one or more of
        a destination telephone number dialed by the subscriber making the request, and
        a set of IP (Internet Protocol) network addresses associated with an attached device used by the subscriber making the request;
    translating the request from the subscriber with the geographical location of the subscriber into a query of a directory listing database;
    retrieving from the directory listing database a local representative of the entity that is the geographically nearest to the subscriber requesting a connection; and
    establishing a voice connection between the subscriber requesting the connection with the local representative of the entity.

2. The method of claim 1, wherein the step of establishing a voice connection includes establishing a voice connection using PSTN between the ISP site and the local representative of the entity.

3. The method of claim 1, wherein the step of establishing a voice connection includes establishing a voice connection using VOIP between the ISP site and the local representative of the entity.

4. The method of claim 1, further comprising the step of:
    transmitting a plurality of service identifiers of entities to at least one subscriber; and the step of receiving further comprises receiving a request from a subscriber for a connection through the selection of at least one of the service identifiers.

5. The method of claim 4, wherein the step of transmitting a plurality of service identifiers includes transmitting at least one trademark of at least one of the entities.

6. The method of claim 1, wherein the step of receiving includes receiving a request for a connection from a subscriber using an information processing system; and wherein the step of determining the geographical location of the subscriber includes the sub-step of:
    sending a browser compatible application to read the destination telephone number dialed by the subscriber making the request.

7. The method of claim 6, wherein the step of sending includes sending a Java application to read the network connection information.

8. The method of claim 6, wherein the step of receiving a request for connection, includes receiving a telecommunications request by a subscriber selecting a service identifier on a web site, and wherein the sub-step of sending a browser compatible application includes sending a browser compatible application from the web site receiving the telecommunications request.

9. The method of claim 1, wherein the step of establishing a voice connections includes establishing a voice connection between the subscriber and the local representative of the entity through an ISP providing data telecommunications network access to the subscriber.

10. The method of claim 1, wherein the step of translating the request from the subscriber includes translating the request into a query of a database coupled to an ISP providing data telecommunications network access to the subscriber.

11. The method of claim 1, wherein the step of determining the geographical location of the user includes querying the ISP through which the subscriber device is attached.

12. The method of claim 1, wherein the step of determining the geographical location of the subscriber includes receiving a caller id associated with the subscriber from the PSTN.

13. The method of claim 1, wherein the step of determining the geographical location of the subscriber includes querying the ISP through which the subscriber device is attached.

14. A method for data telecommunications service provider to establish a voice connection in a telecommunications network between a user and a local representative of an entity, wherein the data telecommunication network comprises a plurality of user systems coupled to a plurality of web sites, at least one web site providing a graphic for identifying an entity, and the data telecommunications service provider providing data telecommunications access between a user and the data telecommunication network, the method comprising:
    displaying on a user system, one or more graphics from at least one web site for identifying one or more entities;
    receiving a selection of at least one graphic from a user system for requesting a connection with an entity;
    sending a web compliant application to the user system requesting the connection with the entity;

receiving network connection information of the user system requesting the connection with the entity;

determining a nearest representative of the entity requested by the user system by using a caller-ID of the user system making the request and if the caller-ID is not available using one or more of a destination telephone number dialed by the user system making the requests, and a set of IP (Internet Protocol) network addresses associated with an attached device used by the user system making the request; and linking the user system requesting the connection with the entity, to the nearest representative of the entity over a telecommunications network, so that the user and the representative of the entity can communicate by voice, wherein the telecommunications network supports simultaneous voice and data connection over a single line from the user system to a data telecommunications service provider.

15. The method of claim 14, wherein the step of linking includes linking the user and the entity requested by the user over a telecommunications network using PSTN between the telecommunication service provider and the representative of the entity.

16. The method of claim 14, wherein the step of linking includes linking the user system and the entity requested by the user over a telecommunications network using VOIP between the telecommunication service provider and the representative of the entity.

17. The method according to claim 14, wherein the step of receiving a network connection information includes receiving a phone number in a dialer program residing on the user system.

18. The method according to claim 17, wherein the step of receiving a network connection information includes receiving a phone number residing on the user system in the modem registry.

19. The method according to claim 14, wherein the step of sending a web compliant application includes sending a web compliant application from at least one web site displaying at least one graphic selected by the user system.

20. The method according to claim 14, wherein the step of sending a web compliant application includes sending a web compliant application from the telecommunication service provider.

21. The method according to claim 14, wherein the step of sending a web compliant application includes sending a web compliant application from an Internet service provider.

22. The method according to claim 14, wherein the step of determining a nearest representative of the entity requested by the user is based on the street address of the representative of the entity.

23. A computer readable medium comprising programming instructions for a data telecommunications service provider to establish a voice connection in a telecommunications network between a user and a local representative of an entity, wherein the data telecommunication network comprises a plurality of user systems coupled to a plurality of web sites, at least one web site providing a graphic for identifying an entity, and the data telecommunications service provider providing data telecommunications access between a user and the data telecommunication network, the programming instructions comprising:

receiving a selection of a graphic for identifying the provider of a service request for a service displayed on a web site from a user system;

sending a web compliant application to the user system requesting the service;

receiving the network connection information of the user system requesting the service;

determining a nearest representative of the entity requested by the user system by using a caller-ID of the user system making the request and if the caller-ID is not available, using one or more of a destination telephone number dialed by the user system making the request, and a set of IP (Internet Protocol) network addresses associated with an attached device used by the user system making the request; and linking the user system requesting the service with the nearest provider of the requested service over a telecommunications network, wherein the telecommunications network supports simultaneous voice and data connection over a single line from the user system to a data telecommunications service provider.

24. The computer readable medium according to claim 23, wherein the programming instruction of linking includes linking the user system and the provider of the system, so they can transfer voice data therebetween.

25. The computer readable medium according to claim 23, wherein the programming instruction of receiving a network connection information includes receiving a phone number in a dialer program residing on the user system.

26. The computer readable medium according to claim 23, wherein the step of determining a nearest representative of the entity requested by the user is based on the street address information of the representative of the entity.

27. A telecommunications service provider system for establishing a data connection in a telecommunications network between a consumer with a local provider of a service, comprising:

a plurality of user systems linked via a telecommunications service provider to a network, each user system having a unique network connection wherein the network connection information is determined using a caller-ID of the user making a request for a connection to a local provider of a service and if the caller-ID is not available using one or more of a destination telephone number dialed be the user making the request, and a set of IP (Internet Protocol) network addresses associated with an attached device used by the user making the request; and wherein at least one user is running a web compliant application with graphics for identifying at least one service provider, wherein the telecommunications network supports simultaneous voice and data connection over a single line from each of the user systems to the telecommunication service provider;

a plurality of web sites couple to the network;

an interface to a directory of service providers; and a global Internet network for linking the request received from a user selecting the graphics from at least one user system to a provider of service that is geographically nearest to the user determined by using the unique network connection information to access the directory of local representatives of entities.

28. The telecommunications service provider system of claim 27 wherein the global Internet network further comprises a PSTN network between the telecommunication service provider and the provider of service.

29. The telecommunications service provider system of claim 28 wherein the global Internet network further comprises a IP network capable of transmitting VOIP between the telecommunication service provider and the representative of the entity.

30. The telecommunications service provider system of claim 28 wherein the telecommunications provider is an Internet Service Provider (ISP).

31. The telecommunications service provider system of claim 28 wherein graphics comprise a trademark.

32. The telecommunications service provider system of claim 28 wherein the network connection information is the telephone number.

33. A computer readable medium for use at an Internet Service Provider site comprising programming instructions for communicating over a telecommunications network with a local representative of an entity, the programming instructions comprising:

receiving, over a data telecommunications network, a request for a connection with a local representative of an entity from a subscriber, wherein the data telecommunications network supports simultaneous voice and data connection over a single line from the subscriber to an Internet Service Provider (ISP) site;

determining the geographical location of the subscriber by using a caller-ID of the subscriber making the request and if the caller-ID is not available, using one or more of a destination telephone number dialed by the subscriber making the request, and a set of IP (Internet Protocol) network addresses associated with an attached device used by the subscriber making the request;

translating the request from the subscriber with the geographical location of the subscriber into a query of a directory listing database;

retrieving from the directory listing database a local representative of the entity that is the geographically nearest to the subscriber requesting a connection; and establishing a voice connection between the subscriber requesting the connection with the local representative of the entity.

34. The computer readable medium according to claim 33, wherein the programming instruction of establishing a voice connection includes establishing a voice connection using PSTN between the telecommunication service provider and the local representative of the entity.

35. The computer readable medium according to claim 33, wherein the programming instruction of establishing a voice connection includes establishing a voice connection using VOIP between the telecommunication service provider and the local representative of the entity.

36. The computer readable medium according to claim 33, further comprising the programming instruction of:

transmitting a plurality of service identifiers of entities to at least one subscriber, and the step of receiving further comprises receiving a request from a subscriber for a connection through the selection of at least one of the service identifiers.

37. The computer readable medium according to claim 36, wherein the programming instruction of transmitting a plurality of service identifiers includes transmitting at least one trademark of at least one of the entities.

38. The computer readable medium according to claim 33, wherein the programming instruction of receiving includes receiving a request for a connection from a subscriber using an information processing system; and wherein the step of determining the geographical location of the subscriber includes the instruction of:

sending a browser compatible application to read the destination telephone number dialed by the subscriber making the request.

39. The computer readable medium according to claim 38, wherein the programming instruction of sending includes sending a Java application to read the network connection information.

40. The computer readable medium according to claim 38, wherein the programming instruction of receiving a request for connection, includes receiving a telecommunications request by a subscriber selecting a service identifier on a web site, and wherein the sub-step of sending a browser compatible application includes sending a browser compatible application from the web site receiving the telecommunications request.

41. The computer readable medium according to claim 33, wherein the programming instruction of establishing a voice connections includes establishing a voice connection between the subscriber and the local representative of the entity through the ISP site providing data telecommunications network access to the subscriber.

42. The computer readable medium according to claim 33, wherein the programming instruction of translating the request from the subscriber includes translating the request into a query of a database coupled to the ISP site providing data telecommunications network access to the subscriber.

43. The computer readable medium according to claim 33, wherein the programming instruction of determining the geographical location of the user includes querying the ISP site through which the subscriber device is attached.

44. The computer readable medium according to claim 33, wherein the programming instruction of determining the geographical location of the subscriber includes receiving a caller id associated with the subscriber from the PSTN between the telecommunication service provider and the local representative of the entity.

45. The computer readable medium according to claim 33, wherein the programming instruction of determining the geographical location of the subscriber includes querying the ISP site through which the subscriber device is attached.

\* \* \* \* \*